(12) United States Patent
Smith

(10) Patent No.: US 8,348,287 B1
(45) Date of Patent: Jan. 8, 2013

(54) SLAB CART

(76) Inventor: Phillip J. Smith, Browns Valley, CA (US)

( * ) Notice: Subject to any disclaimer, the term of this patent is extended or adjusted under 35 U.S.C. 154(b) by 507 days.

(21) Appl. No.: 12/592,594

(22) Filed: Nov. 30, 2009

(51) Int. Cl.
*B62B 3/04* (2006.01)

(52) U.S. Cl. .................. 280/79.7; 280/79.11; 280/47.35; 280/47.34

(58) Field of Classification Search ................. 280/79.7, 280/47.35, 79.11, 47.18, 47.47, 47.19
See application file for complete search history.

(56) References Cited

U.S. PATENT DOCUMENTS

| | | | | |
|---|---|---|---|---|
| 2,466,149 A * | 4/1949 | Burg | ............................ | 280/79.7 |
| 2,514,308 A * | 7/1950 | Burg | ............................ | 280/79.3 |
| 2,816,771 A | 12/1957 | Hunt | | |
| 3,007,710 A * | 11/1961 | Sykes | ............................ | 280/42 |
| 3,729,209 A * | 4/1973 | Litz | ............................... | 280/652 |
| 3,923,167 A * | 12/1975 | Blankenbeckler | .............. | 414/11 |
| 4,488,733 A * | 12/1984 | Hellsten | ..................... | 280/47.16 |
| 4,793,624 A * | 12/1988 | Mace | ......................... | 280/47.16 |
| 5,037,117 A * | 8/1991 | Hershberger | ................ | 280/79.7 |
| 5,163,695 A * | 11/1992 | Pakowsky | .................... | 280/79.7 |
| 5,221,066 A * | 6/1993 | Ferrigan et al. | ............... | 248/166 |
| 5,507,509 A | 4/1996 | Della Polla, Jr. | | |
| 5,584,635 A * | 12/1996 | Stapelmann | ..................... | 414/11 |
| 5,762,348 A * | 6/1998 | Echternacht | ................. | 280/79.7 |
| 5,899,650 A * | 5/1999 | Collins | .......................... | 414/10 |
| 6,019,235 A * | 2/2000 | Ferrigan | ....................... | 211/195 |
| 6,241,447 B1 * | 6/2001 | Echternacht | ................... | 414/11 |
| 6,296,262 B1 * | 10/2001 | Skinner | ........................ | 280/79.7 |
| 6,454,282 B2 * | 9/2002 | Sexton et al. | ............... | 280/79.7 |
| 6,729,632 B2 * | 5/2004 | Ferrigan | ..................... | 280/79.7 |
| 6,857,836 B2 * | 2/2005 | Keller | ............................ | 414/11 |
| 6,902,175 B1 | 6/2005 | Clavey | | |
| 7,004,483 B1 * | 2/2006 | McEntee | .................... | 280/47.35 |
| 7,014,413 B2 * | 3/2006 | Young | .......................... | 414/743 |
| 7,219,905 B1 * | 5/2007 | Wilson | ........................ | 280/79.7 |
| 7,419,170 B2 * | 9/2008 | Krizan et al. | ............... | 280/79.7 |
| 7,527,274 B2 * | 5/2009 | Strauss et al. | ............ | 280/33.991 |
| 7,780,389 B1 * | 8/2010 | Young | ............................. | 414/11 |
| 7,992,883 B2 * | 8/2011 | Brandon | ...................... | 280/79.7 |
| 2001/0016156 A1 * | 8/2001 | Echternacht | ................... | 414/11 |
| 2007/0221592 A1 | 9/2007 | Strauss et al. | | |

* cited by examiner

*Primary Examiner* — Jeffrey J Restifo
(74) *Attorney, Agent, or Firm* — Richard L. Miller

(57) ABSTRACT

A slab cart for sheet material which comprises a dolly component. A shelf component receives the sheet material. A mechanism is for coupling the shelf component to the dolly component in a pivotable manner, so that the shelf component will go from a horizontal position to a vertical position. When the shelf component is in the horizontal position the sheet material will be manually slid off of the shelf component onto a support table and be manually slid from the support table onto the shelf component. When the shelf component with the sheet material is in the vertical position, the sheet material will be held on edge to the shelf component and be transported by the dolly component through the confines of narrow places.

2 Claims, 7 Drawing Sheets

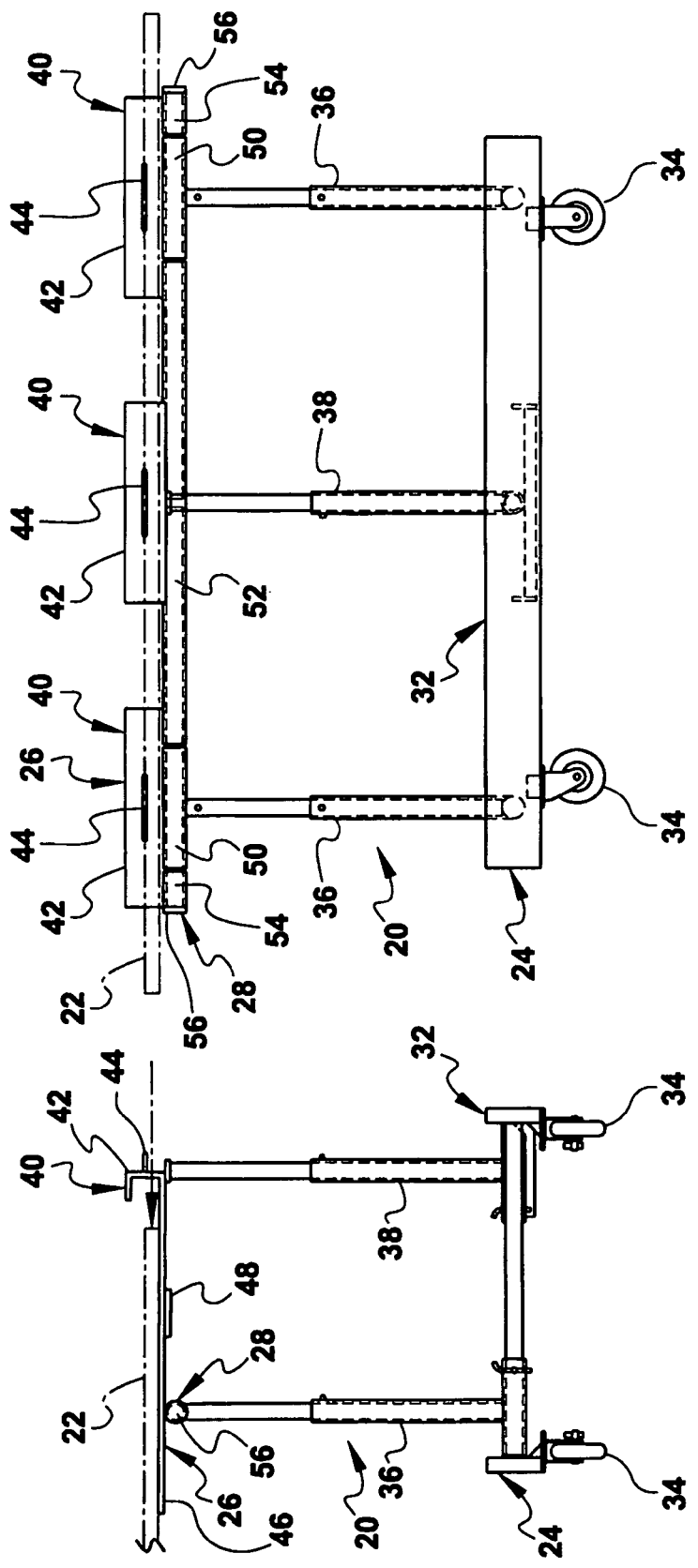

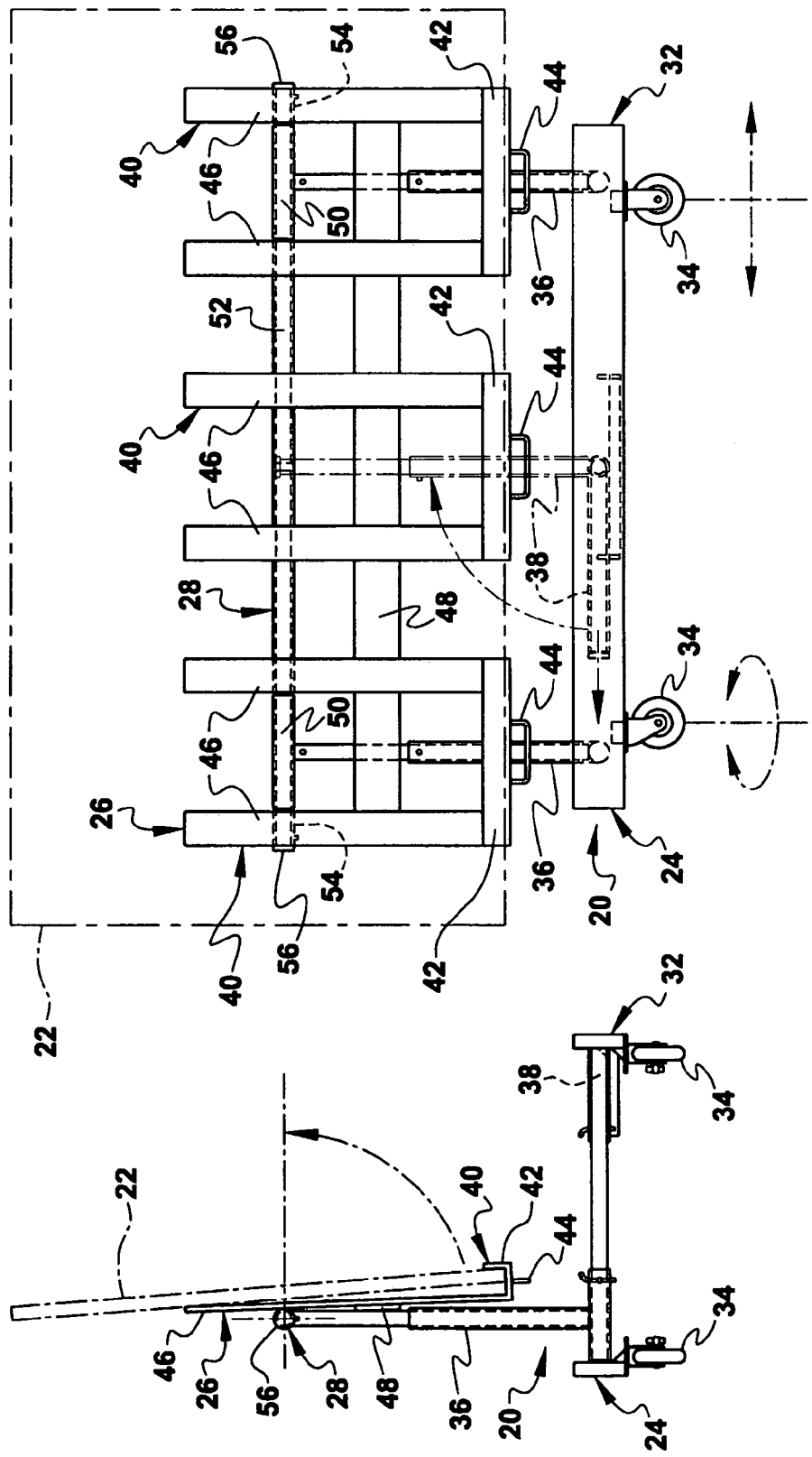

SLAB CART

BACKGROUND OF THE INVENTION

1. Field of the Invention

The present invention relates to a cart, and more particularly, a slab cart.

2. Description of the Prior Art

Numerous innovations for material handling carts have been provided in the prior art that will be described. Even though these innovations may be suitable for the specific individual purposes to which they address, however, they differ from the present invention.

A FIRST EXAMPLE, U.S. Pat. No. 2,816,771, Issued on Dec. 17, 1957, to Hunt teaches a dolly comprising an elongated substantially U-shaped article receiving frame that includes a pair of spaced side members having one of their respective adjacent ends connected by a bight portion, leg members arranged in depending relation at opposite ends of the bight portion, one of the side members projecting upwardly from the bight portion and outwardly therefrom at an obtuse angle relative thereto and having a projecting portion extending upwardly above the upper end of the other of the side members, the projecting portion having an elongated slot formed therein to provide a handle, a boss integrally formed with the bight portion and depending therefrom intermediate the longitudinal ends thereof, a shaft mounted in the boss and having its ends projecting on opposite sides of the side members, and a wheel journalled for rotation on each end of the shaft.

A SECOND EXAMPLE, U.S. Pat. No. 4,793,624, Issued on Dec. 27, 1988, to Mace teaches a cart that is used to transport planar materials such as plywood and drywall through a person size doorway. The transported material is in an upright position supported by a removable vertical side support on a planar elongated frame. The planar elongated frame is larger in the center and tapers inwardly at each end to about half its central width. The central portion of the cart has two large wheels on a transverse axle while the tapered ends each have central casters. The removable vertical side support has three receivers in the upper surface of the planar elongated frame. One of each of the three members of the vertical side support is received in each of the middle and tapered end sections, respectively. The three members meet and form an arched shape with an off-set central member.

A THIRD EXAMPLE, U.S. Pat. No. 5,507,509, Issued on Apr. 16, 1996, to Della Polla Jr. teaches a cart to carry large panels of sheet goods. It incorporates a panel bracing mechanism that automatically adjusts and locks in place different width panels. The cart consists of a wheeled frame, a handle attached to the frame, and a panel bracing mechanism. When a panel is placed in the panel bracing mechanism, the weight of the panel causes braces to shift and lock the panel in place. The cart is moved and steered by the user pushing on the back of the panel. When the panel is lifted from the cart, the weight of the panel is removed and the bracing mechanism releases the panel. Once empty, the pivoting handle is used to pull and direct the cart.

A FOURTH EXAMPLE, U.S. Pat. No. 5,899,650, Issued on May 4, 1999, to Collins teaches an improved slab cart for the transport of a slab including a slab of marble, granite, stone, glass, and heavy objects. A first frame assembly attaches to a first end of a slab and a second assembly attaches to a second end of a slab. The first and second frame assemblies are coupled to the slab in such a manner as to support the slab in an upright position. The first and second frame assemblies each have a pair of elongated frame members and wheels mounted thereto for further supporting the slab and allowing the slab to roll freely without damaging surfaces upon which the slab cart may roll. The slab cart of the present invention is further provided with clamps coupled to the frame assemblies for engaging the slab in clamping relation. A retaining pin couples the ends of each frame member of each frame assembly preventing the frame members from spreading when the clamps are engaged.

A FIFTH EXAMPLE, U.S. Pat. No. 6,902,175, Issued on Jun. 7, 2005, to Clayey teaches a new material handling cart adapted for easy travel over uneven surfaces that includes a pair of independently extendable handles, and optionally having a convertible secondary deck assembly.

A SIXTH EXAMPLE, U.S. Pat. No. 7,219,905, Issued on May 22, 2007, to Wilson teaches a removable side rack system for typical moving dollies which includes two inverted U-shaped frames each having an lockable, articulating stabilizer-support arm anchored to its top crossing bar, an E-track anchor bar spanning between its respective legs and an extending mounting foot at the distal end of each frame leg. Socket brackets secured to lower side members on opposite sides of a moving dolly are adapted to receive and secure the extending mounting feet of the respective U-shaped frames.

A SEVENTH EXAMPLE, U.S. Patent Office Publication No. 20070221592, Published on Sep. 27, 2007, to Strauss et al. teaches a cart that is used for moving an delivering large planar objects to an object receiving table having a substantially flat, horizontal surface. The cart has a base and a rack removably mounted atop the base. The base includes a pivot structure for pivotally fixing the base at a predetermined location, and at least one (preferably three) wheeled base mechanisms arranged to permit the base structure to pivot about that pivot structure into and out of a delivery position in which the rack bottom is located substantially coplanar with and adjacent to the top of the object receiving table.

It is apparent now that numerous innovations for material handling carts have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a slab cart that avoids the disadvantages of the prior art.

ANOTHER OBJECT of the present invention is to provide a slab cart that is simple and inexpensive to manufacture.

STILL ANOTHER OBJECT of the present invention is to provide a slab cart that is simple to use.

BRIEFLY STATED, STILL YET ANOTHER OBJECT of the present invention is to provide a slab cart for sheet material which comprises a dolly component. A shelf component receives the sheet material. A mechanism is for coupling the shelf component to the dolly component in a pivotable manner, so that the shelf component will go from a horizontal position to a vertical position. When the shelf component is in the horizontal position the sheet material will be manually slid off of the shelf component onto a support table and be manually slid from the support table onto the shelf component. When the shelf component with the sheet material is in the vertical position, the sheet material will be held on edge to the shelf component and be transported by the dolly component through the confines of narrow places.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a diagrammatic end view of the present invention per se, taken in the direction of arrow 2 in FIG. 1;

FIG. 3 is a diagrammatic front view of the present invention per se, taken in the direction of arrow 3 in FIG. 1;

FIG. 5 is a diagrammatic end view taken in the direction of arrow 5 in FIG. 4;

FIG. 6 is a diagrammatic front view taken in the direction of arrow 6 in FIG. 4;

A MARSHALING OF REFERENCE NUMERALS UTILIZED IN THE DRAWING

Figure 1:
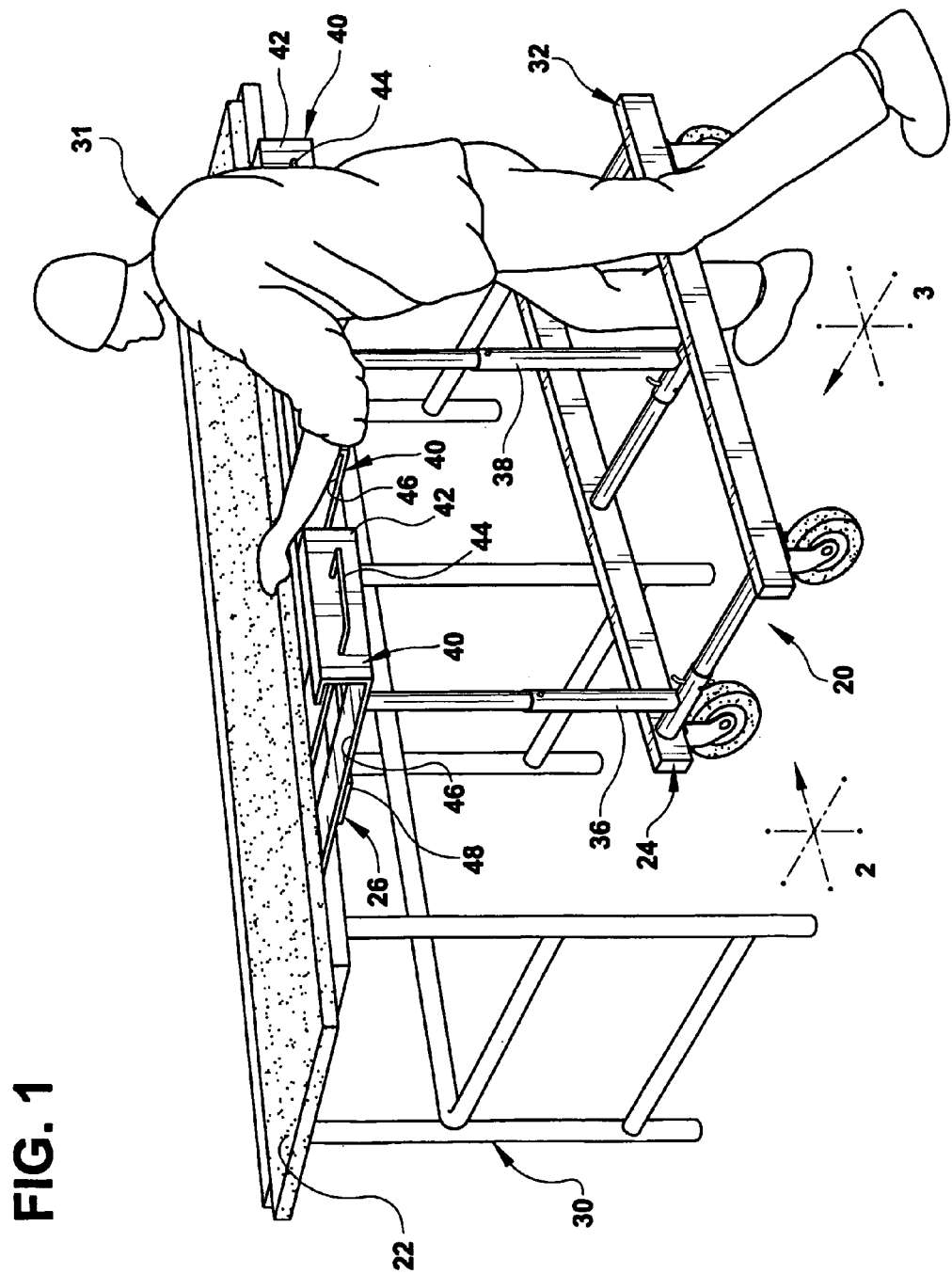
FIG. 1 is a diagrammatic perspective view of an embodiment of the present invention in use.

20 slab cart
22 sheet material
24 dolly component of slab cart 20
26 shelf component of slab cart 20
28 coupling mechanism of slab cart 20
30 support table
31 person
32 rectangular carriage frame of dolly component 24
34 caster of dolly component 24
36 stanchion of dolly component 24
38 upright member of dolly component 24
40 flat U-shaped member of shelf component 26
42 forward hook end of flat U-shaped member 40
44 handle of flat U-shaped member 40
46 flat leg of flat U-shaped member 40
48 flat cross brace of shelf component 26
50 short tube of coupling mechanism 28
52 long tube of coupling mechanism 28
54 stub tube of coupling mechanism 28
56 long shaft component of coupling mechanism 28

DETAILED DESCRIPTION OF THE PREFERRED EMBODIMENT

Figure 4:
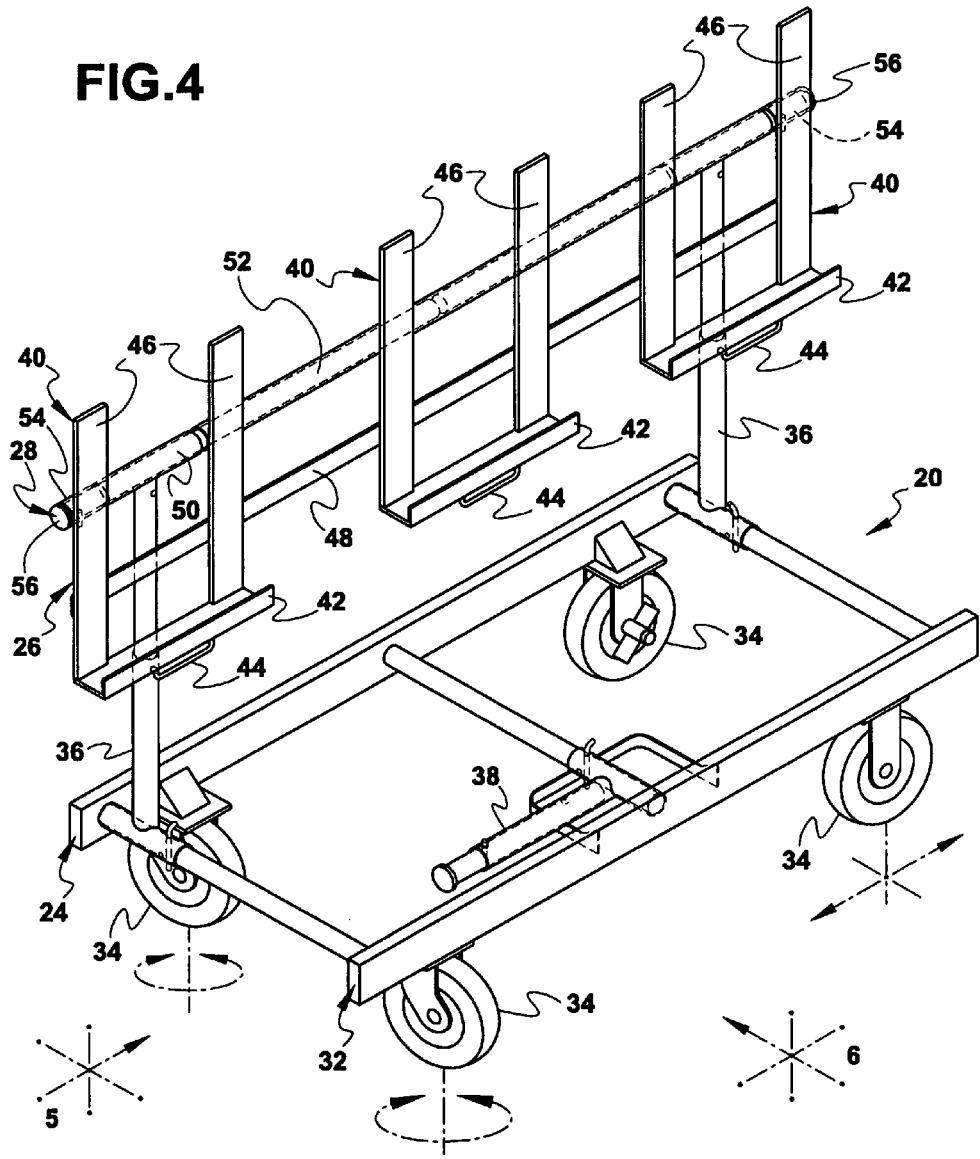
FIG. 4 is a diagrammatic perspective view of the present invention per se, with the shelf component in a vertical position.

Referring now to the figures, in which like numerals indicate like parts, and particularly to FIGS. 1 through 10, which are a diagrammatic perspective view of an embodiment of the present invention in use; a diagrammatic end view of the present invention per se, taken in the direction of arrow 2 in FIG. 1; a diagrammatic front view of the present invention per se, taken in the direction of arrow 3 in FIG. 1; a diagrammatic perspective view of the present invention per se, with the shelf component in a vertical position; a diagrammatic end view taken in the direction of arrow 5 in FIG. 4; a diagrammatic front view taken in the direction of arrow 6 in FIG. 4; a diagrammatic perspective view of the present invention separated into separate components as a preliminary step for facilitating transporting the present invention in a pickup truck or similar conveyance; a diagrammatic perspective view of the shelf component of the present invention with the long shaft components stored therein ready to be transported; a diagrammatic perspective view of the dolly component of the present invention showing the stanchions and the upright member collapsed and folded down to further facilitate transporting the dolly component; and a diagrammatic perspective view of the dolly component of the present invention ready to be transported, and as such, will be discussed with reference thereto.

The present invention is a slab cart 20 for sheet material 22 which comprises a dolly component 24. A shelf component 26 receives the sheet material 22. A mechanism 28 is for coupling the shelf component 26 to the dolly component 24 in a pivotable manner, so that the shelf component 26 will go from a horizontal position to a vertical position. When shelf component 26 is in the horizontal position the sheet material 22 will be manually slid off of the shelf component 26 onto a support table 30 and be manually slid from the support table 30 onto the shelf component 26 by a person 31 using the slab cart 20. When the shelf component 26 with the sheet material 28 is in the vertical position, the sheet material 28 will be held on edge to the shelf component 26 and be transported by dolly component 24 through the confines of narrow places.

The dolly component 24 comprises a rectangular carriage frame 32. Four casters 34 are rotatably mounted to underside of the rectangular carriage frame 32 at each corner thereof. A pair of stanchions 36 are provided. Each stanchion 36 is pivotally mounted and height adjusted oppositely at a rear corner and a front corner of the rectangular carriage frame 32. An upright member 38 is pivotally mounted and height adjusted at center of the rectangular carriage frame 32, opposite from the stanchions 36. The upright member 38 retains the shelf component 26 in the horizontal position.

The shelf component 26 comprises three flat U-shaped members 40. Each flat U-shaped member 40 has a forward hook end 42, a handle 44 extending from the forward hook end 42 and two flat legs 46 extending rearwardly from the forward hook end 42. A flat cross brace 48 is affixed to underside of the flat legs 46 of the flat U-shaped members 40.

The coupling mechanism 28 comprises a pair of short tubes 50. Each short tube 50 is affixed transversely to a top end of each stanchion 36 of the dolly component 24. A long tube 52 is affixed transversely to underside of the flat legs 46 of the second flat U-shaped member 40, and the innermost leg 46 of the first and third flat U-shaped members 40 of the shelf component 26. A pair of stub tubes 54 are provided. Each stub tube 54 is affixed transversely to underside of the outermost flat leg 46 of the first flat U-shaped member 40 and the third flat U-shaped member 40 of the shelf component 26. The pair of stub tubes 54 are in alignment with the long tube 52 with a gap therebetween being of a length of the short tubes 50. A pair of elongated shaft components 56 are also provided. Each elongated shaft component 56 is insertable through one stub tube 54, one short tube 50 and into one side of the long tube 52, thereby allowing the shelf component 26 to pivot thereabout.

Figure 7:
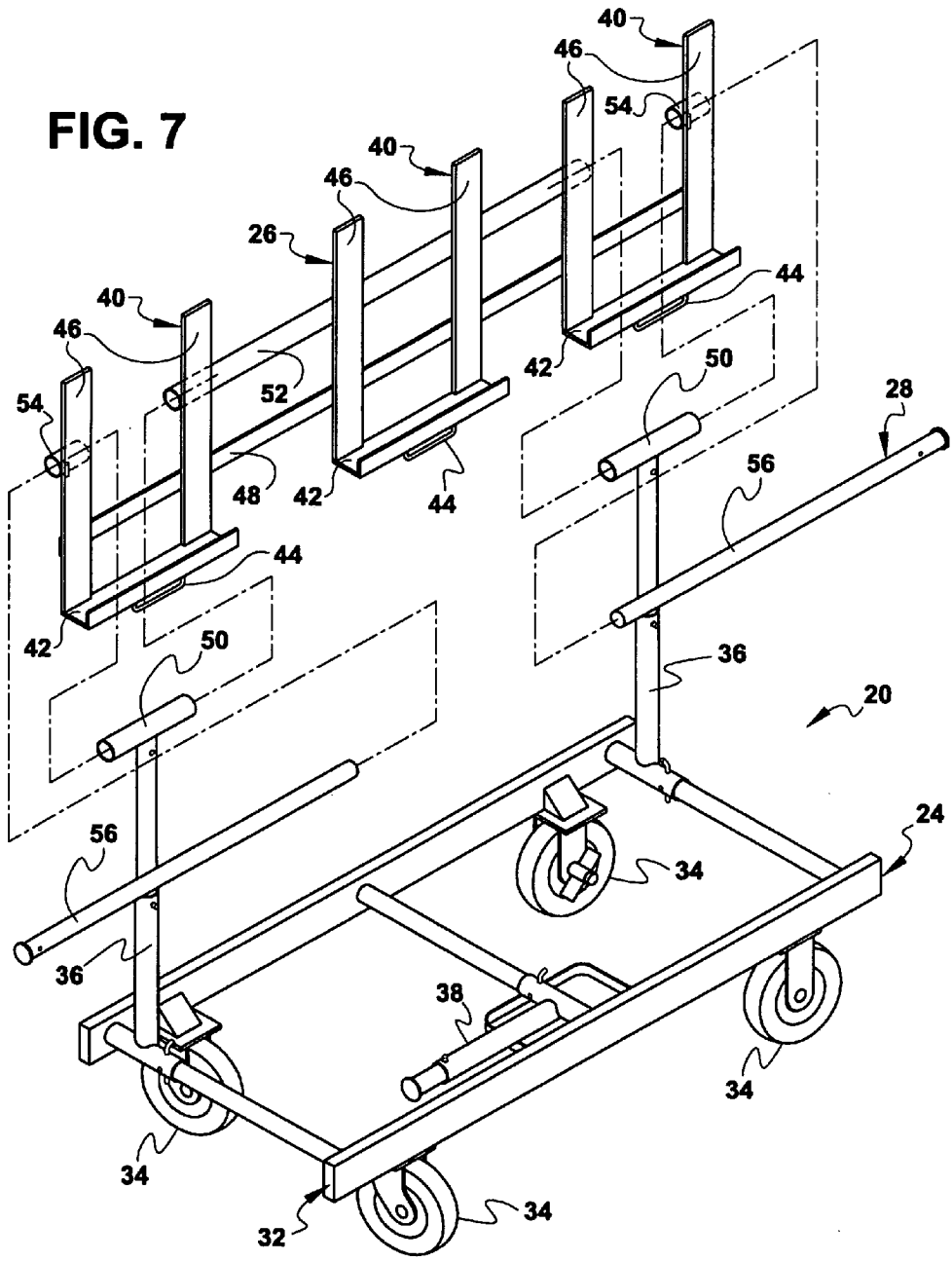
FIG. 7 is a diagrammatic perspective view of the present invention separated into separate components as a preliminary step for facilitating transporting the present invention in a pickup truck or similar conveyance.
Figure 8:
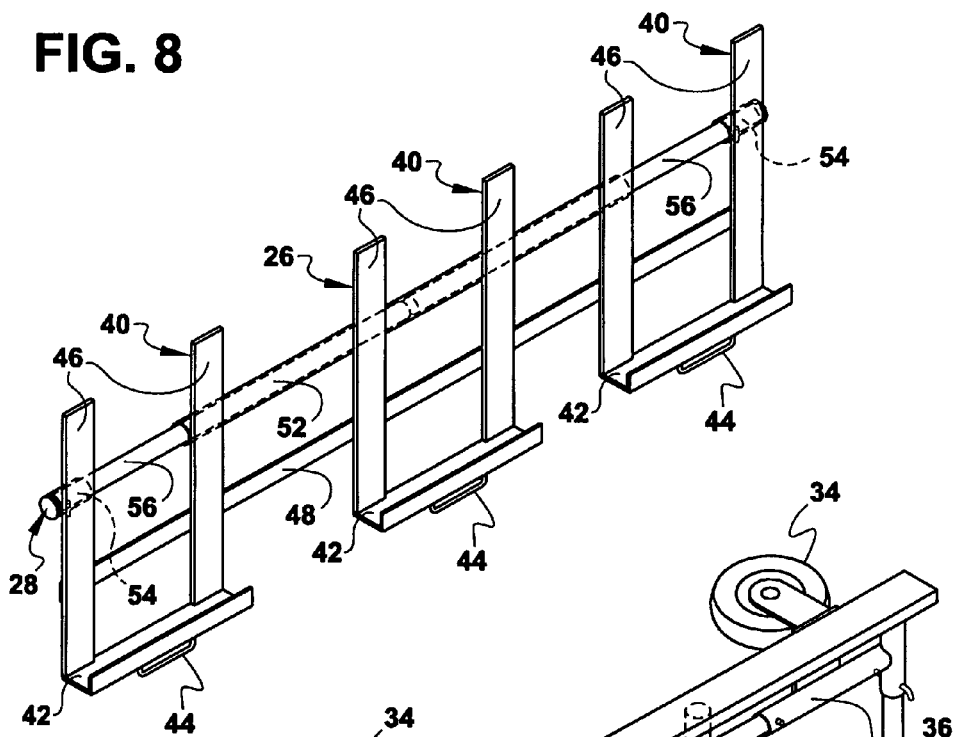
FIG. 8 is a diagrammatic perspective view of the shelf component of the present invention with the long shaft components stored therein ready to be transported.
Figure 10:
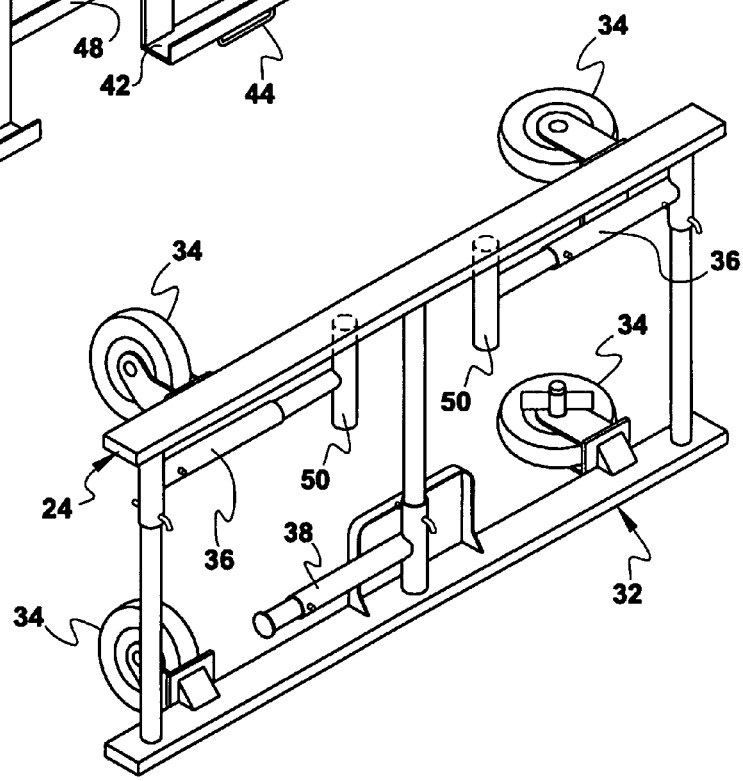
FIG. 10 is a diagrammatic perspective view of the dolly component of the present invention ready to be transported.
Figure 9:
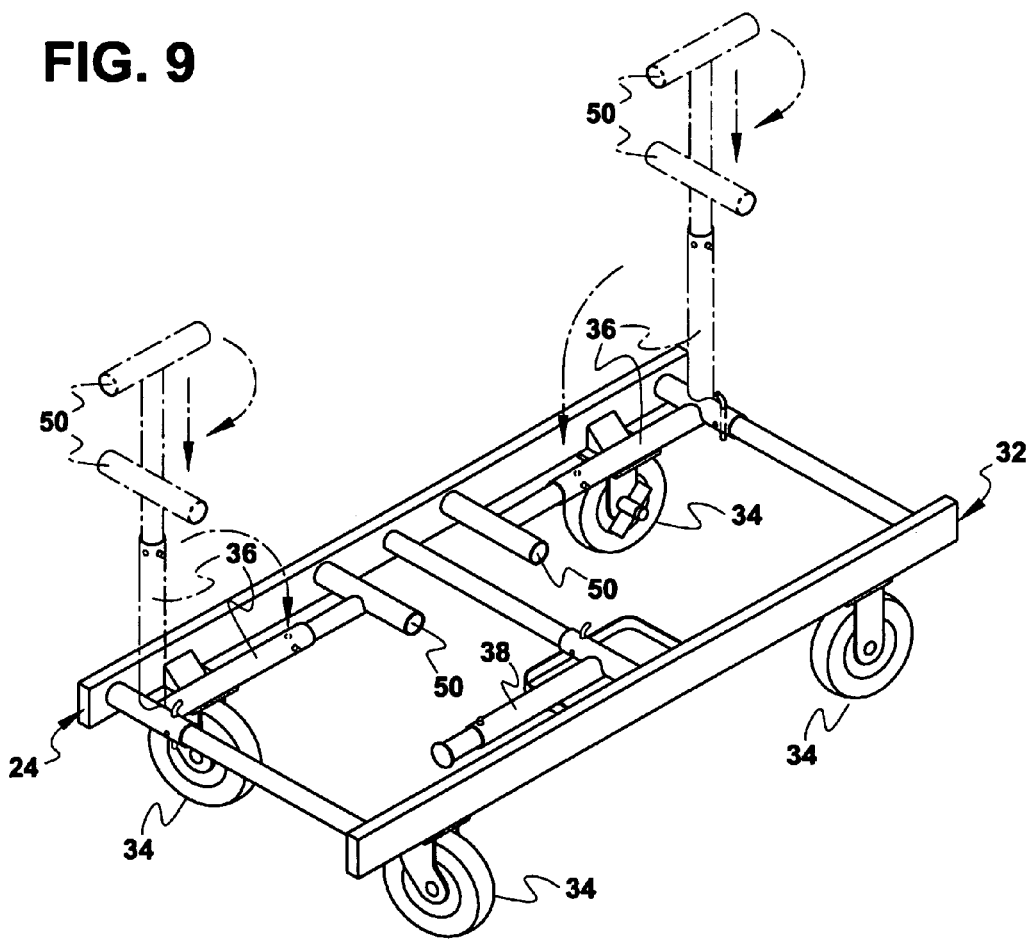
FIG. 9 is a diagrammatic perspective view of the dolly component of the present invention showing the stanchions and the upright member collapsed and folded down to further facilitate transporting the dolly component.

When the person 31 wants to transport the slab cart 20 to another location, the elongated shaft components 56 of the coupling mechanism 28 are removed from between the dolly component 24 and the shelf component 26, as shown in FIG. 7. Once the shelf component 26 is separated, the elongated shaft components 56 are then inserted back through the stub tubes 54 and the long tube 52, as shown in FIG. 8. The stanchions 36 and the upright member 38 of the dolly component 24 are collapsed and folded down as shown in FIGS. 9 and 10. The dolly component 24 and the shelf component 26 of the slab cart 20 can now be transported in a pickup truck or similar conveyance to a different location, then reassembled and used again.

It will be understood that each of the elements described above, or two or more together, may also find a useful application in other types of constructions differing from the types described above.

While the invention has been illustrated and described as embodiments of a slab cart, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A slab cart for sheet material which comprises:
a) a dolly component;
b) a shelf component to receive the sheet material; and
c) means for coupling said shelf component to said dolly component in a pivotable manner, to allow said shelf component to go from a horizontal position to a vertical position, wherein when said shelf component is in the horizontal position the sheet material can be manually slid off of said shelf component onto a support table and be manually slid from the support table onto the shelf component, wherein when said shelf component with the sheet material is in the vertical position, the sheet material can be held on edge to said shelf component and be transported by said dolly component through the confines of narrow places, wherein said dolly component comprises:
d) a rectangular carriage frame;
e) four casters rotatably mounted to underside of said rectangular carriage frame at each corner thereof;
f) a pair of stanchions, wherein each said stanchion is pivotally mounted and height adjusted oppositely at a rear corner and a front corner of said rectangular carriage frame; and
g) an upright member pivotally mounted and height adjusted at center of said rectangular carriage frame opposite from said stanchions, wherein said upright member retains said shelf component in the horizontal position, wherein said shelf component comprises:
h) three flat U-shaped members, with each said flat U-shaped member having a forward hook end, a handle extending from said forward hook end and two flat legs extending rearwardly from said forward hook end; and
i) a flat cross brace affixed to underside of said flat legs of said flat U-shaped members, wherein said coupling means comprises:
j) a pair of short tubes, each said short tube affixed transversely to a top end of each said stanchion of said dolly component;
k) a long tube affixed transversely to underside of said flat legs of said second flat U-shaped member, and said innermost leg of said first and third flat U-shaped members of said shelf component;
l) a pair of stub tubes, each said stub tube affixed transversely to underside of said outermost flat leg of said first flat U-shaped member and said third flat U-shaped member of said shelf component, wherein said pair of stub tubes are in alignment with said long tube with a gap therebetween being of a length of said short tubes; and
m) a pair of elongated shaft components, each said elongated shaft component is insertable through one said stub tube, one said short tube and into one side of said long tube, thereby allowing said shelf component to pivot thereabout.

2. A slab cart for sheet material which comprises:
a) a dolly component, wherein said dolly component comprises:
i) a rectangular carriage frame;
ii) four casters rotatably mounted to underside of said rectangular carriage frame at each corner thereof;
iii) a pair of stanchions, wherein each said stanchion is pivotally mounted and height adjusted oppositely at a rear corner and a front corner of said rectangular carriage frame; and
iv) an upright member pivotally mounted and height adjusted at center of said rectangular carriage frame opposite from said stanchions, wherein said upright member retains said shelf component in the horizontal position;
b) a shelf component to receive the sheet material, wherein said shelf component comprises:
i) three flat U-shaped members, with each said flat U-shaped member having a forward hook end, a handle extending from said forward hook end and two flat legs extending rearwardly from said forward hook end; and
ii) a flat cross brace affixed to underside of said flat legs of said flat U-shaped members; and
c) means for coupling said shelf component to said dolly component in a pivotable manner, to allow said shelf component to go from a horizontal position to a vertical position, wherein when said shelf component is in the horizontal position the sheet material can be manually slid off of said shelf component onto a support table and be manually slid from the support table onto the shelf component, wherein when said shelf component with the sheet material is in the vertical position, the sheet material can be held on edge to said shelf component and be transported by said dolly component through the confines of narrow places, wherein said coupling means comprises:
i) a pair of short tubes, each said short tube affixed transversely to a top end of each said stanchion of said dolly component;
ii) a long tube affixed transversely to underside of said flat legs of said second flat U-shaped member, and said innermost leg of said first and third flat U-shaped members of said shelf component;

iii) a pair of stub tubes, each said stub tube affixed transversely to underside of said outermost flat leg of said first flat U-shaped member and said third flat U-shaped member of said shelf component, wherein said pair of stub tubes are in alignment with said long tube with a gap therebetween being of a length of said short tubes; and iv) a pair of elongated shaft components, each said elongated shaft component is insertable through one said stub tube, one said short tube and into one side of said long tube, thereby allowing said shelf component to pivot thereabout.

* * * * *